Nov. 3, 1936.   R. J. QUIGLEY   2,059,654
AXLE GAUGE
Filed Oct. 3, 1935   2 Sheets-Sheet 1

Inventor
Raymund J. Quigley

By Clarence A. O'Brien
Attorneys

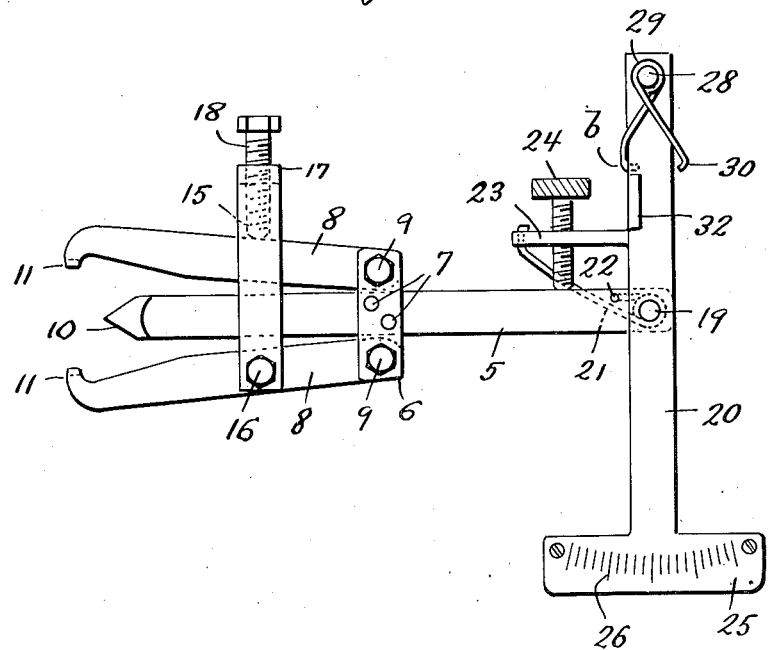

Patented Nov. 3, 1936

2,059,654

UNITED STATES PATENT OFFICE 2,059,654

AXLE GAUGE

Raymund J. Quigley, Ann Arbor, Mich.

Application October 3, 1935, Serial No. 43,414

1 Claim. (Cl. 33—203)

This invention appertains to new and useful improvements in axle gauges and more particularly to a gauge for determining the caster or tilt of the axle.

An important object of the invention is to provide a caster gauge which can be quickly applied to the spindle for determining the position of the wheel.

Other important objects and advantages of the invention will become apparent to the reader of the following specification.

In the drawings:

Figure 2 represents an elevational view of the instrument with the level and pointer detached.

Figure 3 represents an elevational view of the level and pointer.

Figure 1:
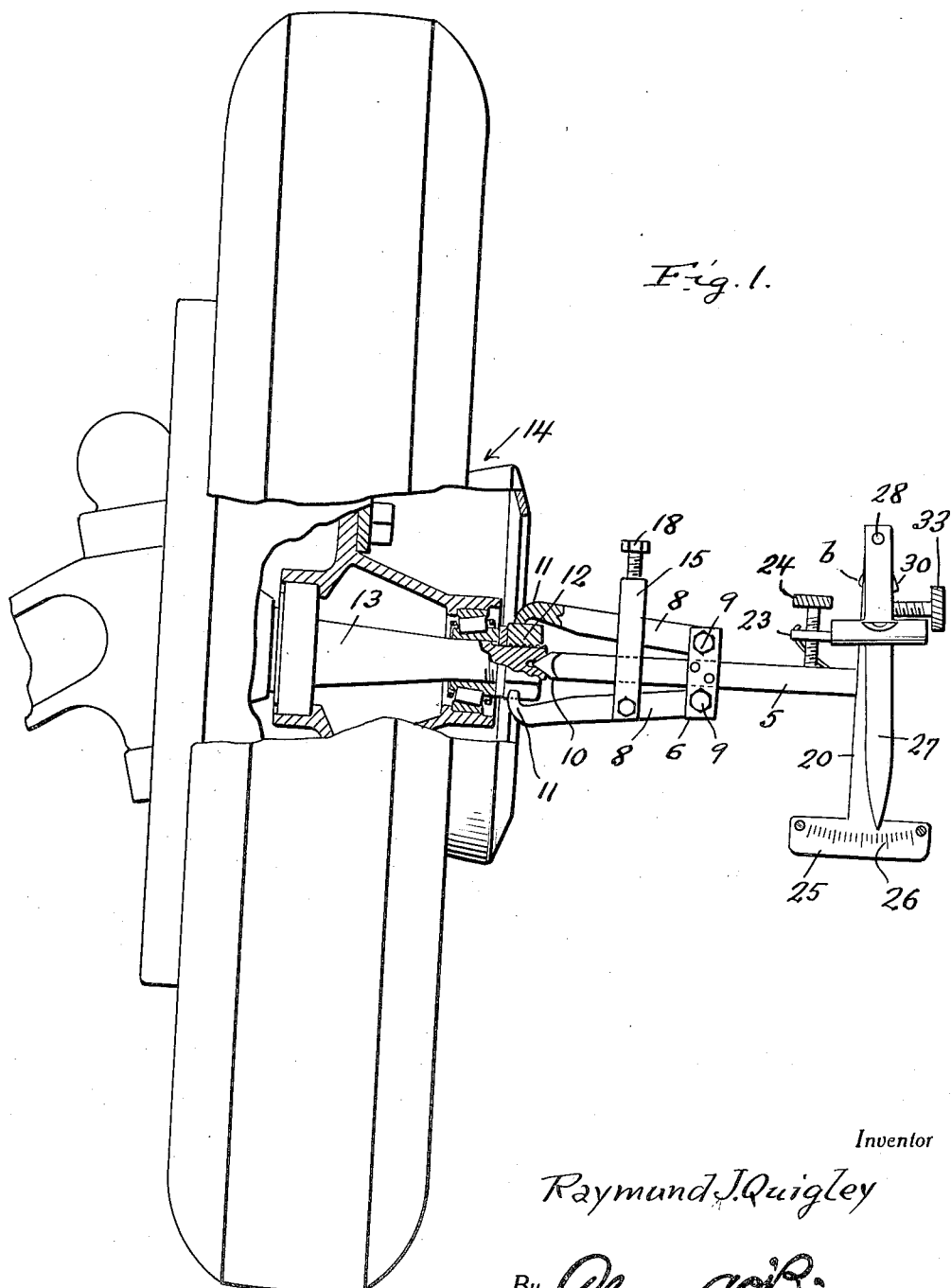
Figure 1 represents a fragmentary front elevational view of a front wheel partly in section and showing the implement attached and also partly in section.

Referring to the drawings wherein like numerals designate like parts, it can be seen that the instrument consists of an elongated bar 5 having cross members 6 secured against opposite sides thereof by rivets or like securing members 7. Between the protruding ends of these cross members 6 are the claw arms 8 pivotally connected thereto by bolts 9. These claw arms 8 extend at their free end portions beyond the pointed end 10 of the bar 5 and are provided with claw heads 11. These claw heads have plane side portions for gripping the usual retaining nut 12 on the spindle 13 of a wheel structure generally referred to by numeral 14.

A U-shaped member 15 is secured by the free ends of its leg portions to one of the claw arms 8 by a screw or bolt 16 and threaded through the bight portion 17 thereof is a set screw 18 which bears against the remaining arm 8 and obviously when this is tightened against the last mentioned arm 8 the heads 11—11 can be firmly clamped against the said nut 12.

A suitable pin 19 pivotally connects the intermediate portion of the T-shaped member 20 to the remaining end of the bar 5 and around this pin is convoluted the wire spring 21 with one end anchored to the bar 5 as at 22 and the other end connected to the outstanding lug 23 on the T-shaped member 20. A set screw 24 is feedable through the lug 23 and against the bar 5 for equalizing the position of the T-shaped member 20 with respect to the bar 5. The head portion 25 of the T-shaped member 20 is provided with graduations 26 thereon with which the pointed end $a$ of the pointer 27 is affiliated. This pointer 27 is swingable on the pin 28 carried at the opposite end of the T-shaped member 20 from the head 25. Around this pin 28 is the wire spring 29 one end of which engages behind the the T-shaped member 20 as at $b$ while the other end is hook-shaped as at 30 to engage over the edge of the lug 31 on the inner side of the pointer 27. The inner side of the T-shaped member 20 is provided with a lug 32 opposed to the lug 31 on the pointer 27 and a set screw 33 is feedable through the lug 31 and against the lug 32 to properly position the pointer with respect to the gauge 26. The pointer 27 carries a transversely disposed liquid level 34.

In checking the caster of the front axle with this gauge, first remove the hug cap of a wheel and next pull out the cotter key from the spindle and tighten the spindle nut.

Then place the pointer 10 of the gauge bar 5 in the end of the spindle. The claw heads 11 are then located on the nut and firmly clamped in place by the screw 18. The vehicle must of course have the front wheels jacked off of the ground for the test.

The one at this end checking the left side of the axle, it is necessary to attach the gauge to the left spindle and turn the steering wheel to the right through an angle of 30 degrees, then adjust the hand or pointer 27 to zero on the scale 26. This adjustment can be made easily by using the adjusting screw 33. The end of the spindle must travel the distance of the length of the spindle, because the check is made on a vertical circle in right angular relation to a horizontal circle. The gauge checks the degrees in which the spindle rises or lowers, which is at right angles to the last mentioned vertical circle. This gauge is intended to be used with a radius gauge, which indicates the number of degrees the wheel is turning forward or backward. The spindle must turn 60 degrees of a horizontal circle or 30 degrees forward and 30 degrees rearward of a straight position. The turning radius can be changed to 40 degrees or 20 degrees each way from center position by making the degree marks or spaces two-thirds of their normal distances.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A caster gauge for vehicle axles, comprising an elongated bar pointed at one end for engaging an axle spindle end, clamp means for aligning the bar with the axle spindle, a gauge on the opposite end of the bar, said gauge consisting of a T-shaped member pivotally supported on the bar, the head portion of the said T-shaped member having a scale thereon, a pivoted indicator or hand on the T-shaped member cooperating with the scale, spring means on the T-shaped member engaged with the indicating hand for retaining the hand at an intermediate portion on the scale, a lug on the T-shaped member, a set screw disposed through the lug and engaged with the bar whereby the T-shaped member can be set properly with respect to the bar, and a level supported on the said indicating arm.

RAYMUND J. QUIGLEY.